United States Patent
Boyce et al.

(10) Patent No.: US 9,204,167 B2
(45) Date of Patent: Dec. 1, 2015

(54) VIDEO ERROR DETECTION TECHNIQUE USING A CRC PARITY CODE

(75) Inventors: Jill MacDonald Boyce, Manalapan, NJ (US); Alan Jay Stein, Princeton Junction, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 2009 days.

(21) Appl. No.: 11/795,436

(22) PCT Filed: Jan. 24, 2005

(86) PCT No.: PCT/US2005/002335
§ 371 (c)(1),
(2), (4) Date: Jul. 17, 2007

(87) PCT Pub. No.: WO2006/080910
PCT Pub. Date: Aug. 3, 2006

(65) Prior Publication Data
US 2008/0298470 A1    Dec. 4, 2008

(51) Int. Cl.
*H04N 19/61*    (2014.01)

(52) U.S. Cl.
CPC ..................... *H04N 19/61* (2014.11)

(58) Field of Classification Search
CPC ...................................... H04N 19/61
USPC ............ 375/240.01, 240.03, 240.25, 240.26, 375/240.27
See application file for complete search history.

(56) References Cited

U.S. PATENT DOCUMENTS

| | | | |
|---|---|---|---|
| 4,126,764 A | 11/1978 | Downey et al. | |
| 4,394,762 A | 7/1983 | Nabeshima | |
| 5,778,191 A * | 7/1998 | Levine et al. | 709/247 |
| 5,872,577 A * | 2/1999 | Perrin | 345/535 |
| 6,029,265 A | 2/2000 | Itol et al. | |
| 6,229,854 B1 * | 5/2001 | Kikuchi et al. | 375/240.27 |
| 6,332,003 B1 * | 12/2001 | Matsuura et al. | 375/240.23 |
| 6,445,742 B1 | 9/2002 | Yoo et al. | |
| 6,609,225 B1 * | 8/2003 | Ng | 714/781 |

(Continued)

FOREIGN PATENT DOCUMENTS

| | | |
|---|---|---|
| JP | 7038854 | 2/1995 |
| JP | 10116204 | 5/1998 |

(Continued)

OTHER PUBLICATIONS

Song, Jie, and KJ Ray Liu. "A data embedded video coding scheme for error-prone channels." Multimedia, IEEE Transactions on 3.4 (2001): 415-423.*

(Continued)

*Primary Examiner* — Kari Schmidt
(74) *Attorney, Agent, or Firm* — Robert D. Shedd; Paul P. Kiel; Xiaoan Lu

(57) ABSTRACT

Detection of errors in a video stream occurs by calculating an error detection code, such as a Cyclic Redundancy Check (CRC) code over a group of not more than N macroblocks in a slice of the stream prior and after transmission, where N is an integer greater than zero but less than the total number of macroblocks in the slice. A comparison of the error detection codes reveals whether any errors exist in the group of macroblocks. If the group has no errors, normal decoding occurs. If the macroblock group has an error, then the macroblock group, and the remaining blocks in the slice undergo error concealment.

10 Claims, 1 Drawing Sheet

(56) References Cited

U.S. PATENT DOCUMENTS

| | | | |
|---|---|---|---|
| 6,611,561 B1* | 8/2003 | Hannuksela et al. | 375/240.27 |
| 7,020,203 B1* | 3/2006 | Horowitz et al. | 375/240.24 |
| 7,230,986 B2* | 6/2007 | Wise et al. | 375/240.26 |
| 7,607,070 B2* | 10/2009 | Clark et al. | 714/776 |
| 2001/0000543 A1* | 4/2001 | Kajala et al. | 714/752 |
| 2002/0146074 A1* | 10/2002 | Ariel et al. | 375/240.27 |
| 2002/0157058 A1* | 10/2002 | Ariel et al. | 714/774 |
| 2003/0108011 A1* | 6/2003 | Lee et al. | 370/335 |
| 2004/0190609 A1 | 9/2004 | Watanabe | |
| 2005/0123207 A1* | 6/2005 | Marpe et al. | 382/239 |
| 2005/0174768 A1 | 8/2005 | Conner | |
| 2005/0175093 A1* | 8/2005 | Haskell et al. | 375/240.03 |
| 2005/0286024 A1 | 12/2005 | Gupta | |
| 2006/0092337 A1 | 5/2006 | Howard | |
| 2006/0139580 A1 | 6/2006 | Conner | |
| 2006/0221305 A1 | 10/2006 | Magarill | |

FOREIGN PATENT DOCUMENTS

| | | |
|---|---|---|
| JP | 11164296 | 6/1999 |
| JP | 2002268731 | 6/2001 |
| JP | 2002374535 | 12/2002 |
| JP | 200318595 | 1/2003 |
| JP | 2003209837 | 7/2003 |
| JP | 2005121960 | 5/2005 |
| JP | 2005242364 | 9/2005 |
| JP | 2005300712 | 10/2005 |
| JP | 2007524976 | 8/2007 |
| JP | 2008537788 | 9/2008 |

OTHER PUBLICATIONS

Wu, Feng, et al. "SMART: an efficient, scalable, and robust streaming video system." EURASIP Journal on Applied Signal Processing 2004: 192-206.*

Chung-How, J.T.H. et al.: "Loss resilient H.263 + video over the Internet", Signal Processing Image Communication, Elsevier Science Publishers, Amsterdam, NL., vol. 16, No. 9, Jun. 2001, pp. 891-908, XP004245274.

Papadakis, V. et al.: "Syntax based error concealment" Circuits and Systems, 1998, ISCAS 98. Proceedings of the 1998 IEEE International Symposium in Monterey, CA, USA, May 31-Jun. 3, 1998, IEEE, US, vol. 4, pp. 265-268, XP010289439.

International Search Report, dated Jul. 8, 2005.

Khalifa et al., "Cyclic Redundancy Encoder for Error Detection in Communication Channels", 2004 IEEE, 2004 RF and Microwave Conference, Subang, Selangor, Malaysia, Oct. 5-6, 2004, pp. 224-226.

* cited by examiner

VIDEO ERROR DETECTION TECHNIQUE USING A CRC PARITY CODE

This application claims the benefit, under 35 U.S.C. §365 of International Application PCT/US2005/002335, filed Jan. 24, 2007 published in accordance with PCT Article 21(2) on Aug. 3, 3006 in English.

TECHNICAL FIELD

This invention relates to a technique for detecting errors in a video bit stream.

BACKGROUND ART

The implementation of present day video compression standards, such as MPEG, H.263 and JVT (also known as ISO/ITU H.264) result in the division of video frames into macroblocks and slices. A slice generally contains a given number of consecutive macroblocks. However, the use of the Flexible Macroblock Ordering option for video compressed in accordance with the JVT compression standard can result in the macroblocks in a slice are not necessary being adjacent to one another in display order. Variable Length Coding (VLC) techniques can enhance compression efficiency, at the expense of error resiliency. An error in a bit stream can propagate undetected and corrupt all subsequent macroblocks in a slice.

To enable error recovery, the header of each slice contains a resynchronization marker. Such markers constitute the earliest point at which proper decoding can take place following a bit error. Slice headers begin on a byte boundary so as to be byte aligned whereas individual macroblocks are not byte aligned. When using Context-based Adaptive Binary Arithmetic Coding in the connection with the coding of a video bit stream in accordance with the JVT compression standard, multiple symbols can be coded as a single bit, so that macroblock boundaries are not even bit aligned. In this regard, precise identification of when bit errors occur the decoder becomes difficult to variable length code words. Most bit patterns in a corrupted bit stream represent valid code words, even if they don't represent correct values. In some cases, identification of invalid code words can occur if the decoded value reaches beyond a legitimate range, but this will not always become apparent until incorrect decoding of a variable, unknowable amount. Thus all macroblocks in a slice following an error remain suspect for corruption.

Video error detection can occur by decoding a video frame and then checking the frame for spatial discontinuities at macroblock and slice boundaries, in the pixel domain. Various proposals now exist for video error detection and concealment. Follow detection of errors in particular macroblocks, error concealment can occur on the corrupt macroblocks. Concealed macroblocks will generally appear perceptually better than unconcealed corrupt macroblocks, but perceptually worse than correctly decoded macroblocks. However, present day concealment algorithms consume significant resources, making then computationally expensive. Moreover, such algorithms are also prone to false positives (concealing correctly decoded macroblocks) and false negatives (failure to conceal corrupted macroblocks.)

One approach to overcoming the problem of corrupted macroblocks recommends transmitting an entire slice in a single IP packet. Should a slice become lost during transmission, all macroblocks in the slice become marked as missing and thus require concealment. As previously mentioned, all data in a packet with a known transmission error will be marked as corrupted, discarded and concealed. Thus, an entire slice will now become lost in the case of a detected transmission error. Assigning relatively few macroblocks per slice will improve error resilience, but at a significant cost of coding and transport efficiency.

Thus, a need exists for a technique for detecting bit stream errors enjoys a relatively low computational complexity.

BRIEF SUMMARY OF THE INVENTION

Briefly, in accordance with a preferred embodiment, there is provided a method for detecting errors in a coded video stream. The method commences upon the receipt of a coded video stream along with a first parity code calculated over a group of N macroblocks in the stream prior to transmission. The stream undergoes decoding to form a group of decoded macroblocks. A second parity calculation occurs over the group of decoded macroblocks, and a comparison is made between the first and second parity codes to determine whether the group of decoded macroblocks contains an error.

Briefly, in accordance with another preferred embodiment of the present principles, there is provided a technique for detecting errors during transmission of a video bit stream comprised of compressed macroblocks. A Cyclic Redundancy Check (CRC) parity code is calculated over a group of the compressed macroblocks forming the video stream prior to transmission. Upon receipt of the group of compressed macroblocks, a second CRC parity calculation occurs. The CRC codes undergo a comparison. If the CRC codes match, then the no error has occurred, and normal decoding or other processing of the group of blocks can take place. In the event of an error, the macroblocks in the group undergo error concealment. When the groups of macroblocks undergo compression in accordance with the JVT video compression standard, the CRC parity codes can be transmitted as SEI messages.

DETAILED DESCRIPTION

Figure 1:
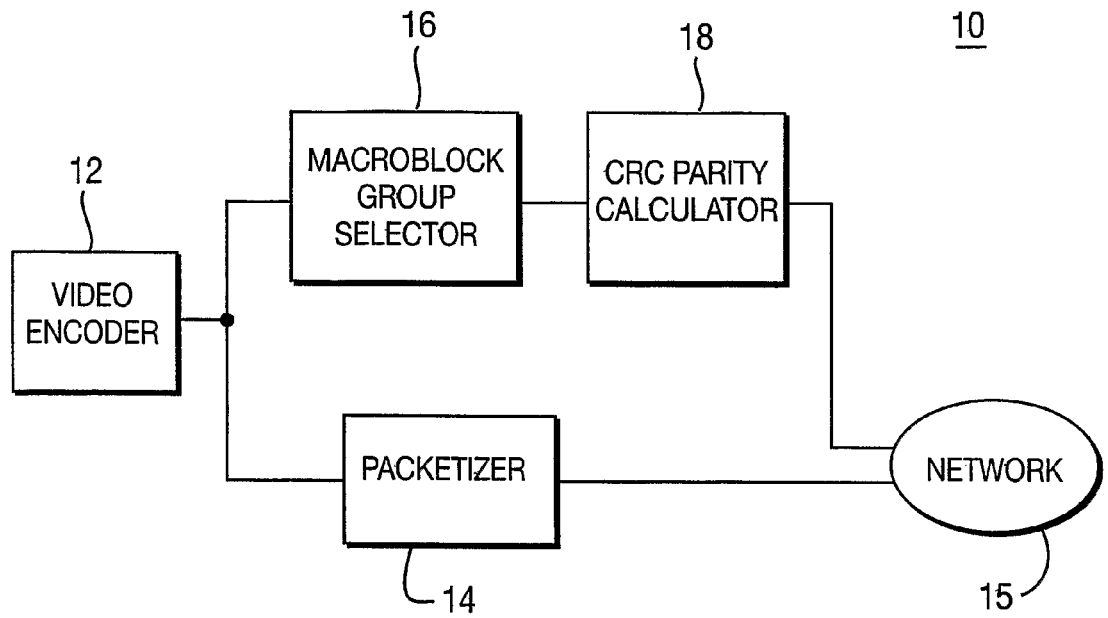
FIG. 1 depicts a block schematic diagram of an illustrative embodiment for a transmission apparatus in accordance with a preferred embodiment of the present invention for transmitting groups of compressed macroblocks and accompany CRC parity calculations.
Figure 2:
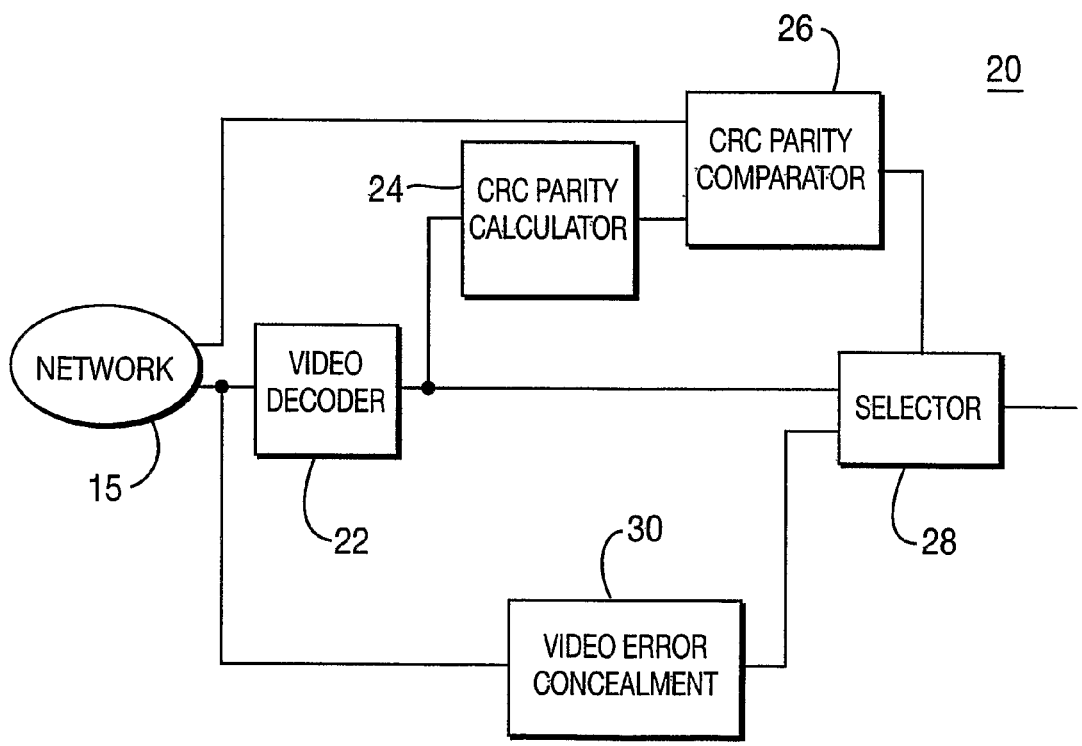
FIG. 2 depicts a block schematic diagram of an illustrative embodiment of a receiver apparatus for receiving compressed macro blocks and CRC parity calculations from the transmitter of FIG. 1 for error detection and concealment as necessary.

FIGS. 1 and 2 depict a transmitter 10 and receiver 20, respectively, in accordance with the present principles, which operate in combination, to enable the detection of errors in a video stream transmitted from the transmitter to the receiver, and the concealment of such errors upon their detection. As described in greater detail below, the combination of the transmitter 10-receiver 20 make use of a Cyclic Redundancy Check (CRC) for detecting errors. The CRC constitutes a commonly used error detecting code, used in the creation of a Frame Check Sequence (FCS) appended to a block of data before transmission. Upon receipt of the data block, the CRC enables detection of bit errors. CRC codes are commonly applied to 8-bit, 16-bit and 32-bit symbols. One commonly used 16-bit CRC generator polynomial is $X^{16}+X^{12}+X^5+1$.

The number of bits or bytes over which a CRC is applied must be known upon reception, in order to perform error detection. CRCs can be applied to fixed length blocks of data, where a pre-determined fixed length is known at the transmitter and the receiver. Alternatively, CRCs can be applied to variable length packets, which contain a length field in their headers, so that the receivers can determine the length over which to apply the CRC checking computation. If the CRC check upon data reception reveal a corrupt packet, all of the data in the packet is generally discarded, even if a portion of valid data exists because the CRC does not provide information about where in the packet the corruption occurred.

To overcome the aforementioned disadvantage, transmitter 10 and receiver 20 of FIGS. 1 and 2, respectively make an association between individual macroblocks and the bits or bytes of compressed data that are associated with that particular macroblock. When the compressed data representing a macroblock is not bit or byte aligned, the entire bit or byte of a partial bit or byte is associated with the macroblock. A single bit or byte may be associated with more than one macroblock. As discussed in greater detail, a CRC parity calculation is applied to the compressed bits or bytes that are associated with a group of N macroblocks, creating a CRC parity code, where N is an integer. The next N macroblocks in the slice, or fewer if less than N macroblocks remain in the slice, may be grouped together and another CRC parity calculation applied to them, creating another parity code. This grouping of N macroblocks and the calculation of a CRC parity code over each set of N blocks continues until all of the macroblocks in the slice have been used. By calculating the CRC parity code over sets of blocks within a slice (rather than over the whole the slice), each group of N blocks found to be error free will then undergo processing (i.e., decoding), while each group found to contain an error will undergo concealment. This avoids having to discard an entire slice should an error be detected.

FIG. 1 depicts the details of the transmitter 10. A video encoder 12 within the transmitter receives an incoming stream of video and encodes (i.e., compresses) the video stream in accordance with any of several well-known compression techniques, including but not limited to MPEG, H.263 and JVT. In the illustrated embodiment, the encoder 12 encodes the incoming video stream in accordance with the JVT compression standard. A packetizer 14 packetizes the encoded video from the encoder for transmission across a network 15 to the receiver 20 of FIG. 2.

A selector block 14 within the transmitter 10 selects N compressed macroblocks within each slice encoded by the encoder 12. To the extent that less than N macroblocks remain in the slice, the selector 14 will bundle such remaining macroblocks in a group. A CRC parity calculator 18 calculates a CRC parity code over the bits or bytes representing the N compressed macroblocks. The parity codes that are calculated are transmitted along with the compressed video data, either in a separate packet from the slice's compressed video data, or a the beginning of the same packet at the slice compressed video data. The value of N may either be pre-determined and known in advance at both transmitter 10 and the receiver 20 of FIGS. 1 and 2, respectively, or can be transmitted along with the CRC parity codes. When the video encoder 12 encodes the incoming video in accordance with the JVT compression standard as in the illustrated embodiment, the CRC parity calculation made by the CRC parity calculator 18 can be transmitted as Supplemental Enhancement Information, along with the encoded video.

FIG. 2 depicts the details of the receiver 20. The receiver 20 includes a video decoder 22 for decoding the encoded video packets transmitted through the network 15 by the transmitter 10 of FIG. 1. In the illustrated embodiment, the video decoder 22 within the receiver 20 of FIG. 2 operates to decode the packetized video originally encoded in accordance with the JVT video compression standard. A CRC parity calculator 24 calculates a CRC parity code over each group of N macroblocks decoded by the video decoder 22 corresponding to each of the N decoded macroblocks over which the CRC parity calculator 18 of FIG. 1 calculated a parity code. In other words, each of the CRC parity code calculators 18 and 24 of FIGS. 1 and 2, respectively, calculates a CRC parity code over the same group of N macroblocks.

A CRC parity comparator 26 within the receiver 20 of FIG. 2 compares the CRC parity code calculated by the CRC parity calculator 24 to the CRC parity code received in the SEI message from the CRC parity calculator 18. A match of the two CRC parity codes means that the group of N macroblocks decoded by the decoder 22 contains no error relative to the same group of N macroblocks transmitted by the transmitter 10 of FIG. 1. Under such circumstances, a selector 28 will allow that error-free group of N macroblocks to pass to their destination, which could include a display (not shown) or a recording device for example. In event the CRC parity codes do not match, as will occur in the event of an error, then the group of N macroblocks undergo concealment by a video error concealment block 30 that alerts the video decoder 22 of such action.

Advantageously, the decoder 22 of FIG. 2 knows which group of macroblocks are affected by the error, based on information received from the video error concealment block 30. Macroblocks associated with each group in the slice received earlier than the errored group under go normal decoding because such blocks have no errors. Macroblocks in the errored group and those later in the slice, are deemed corrupted, and are concealed instead of being decoded.

As compared to prior art methods where a single CRC code applies to an entire slice, the error detection technique of the present principles affords the advantage that those macroblocks in groups preceding a transmission error will have no errors and do not need be concealment or testing for discontinuities. Non-corrupt macroblocks that improperly undergo concealment generally have lower visual quality than correctly decoded macroblocks. Because of inter-frame coding, lower visual quality can persist for longer periods of time.

The error detection technique of the present principles compares favorably to methods that apply spatial continuity measures to the decoded video to detect the location of transmission errors. It has the advantage of greatly reduced computational complexity, because the calculation of a CRC parity code and the comparison to a received value incurs much less complexity than measuring spatial discontinuities. The technique of the present principles has the advantage of avoiding false positives, where uncorrupted macroblocks undergo inappropriate concealment, and avoiding false negatives, where corrupted macroblocks do not undergo concealment but should do so.

When applied to the MPEG-2 video compression standard, the CRC parity codes, and optionally the value of N, can undergo transmission in user data fields. When applied to the JVT video compression standard, the CRC parity codes, and optionally the value of N, can undergo transmission in one or more SEI messages or in user data.

The selection of N, the number of macroblocks over which calculation of the CRC parity code occurs, will depend on the expected error rate of the network 15. Choosing a large value of N (fewer groups of macroblocks, more macroblocks per group) reduces the overhead for transmitting the CRC parity codes, but the precision of error detection will suffer. Choosing a small value of N (more groups of macroblocks, fewer macroblocks per group) will increase the overhead of transmitting the CRC parity codes, but improves the precision of error location. For small values of N, assuming uniformly distributed errors and uniform compression for all macroblocks in the slice, the ratio of macroblocks that can be identified as being not corrupted will approach ½.

Although the error detection technique described above makes use of a CRC code, any type of error detection or correction polynomial can be used. CRC codes are generally calculated and applied over bytes. Further, the present technique does not require calculation and transmission of CRC parity codes for all macroblocks in a slice. In some instances, sending parity codes for earlier macroblocks in the slice than for the later macroblocks can prove advantageous, as once detection of an error occurs in a compressed slice, the remainder of the macroblocks in the slice cannot undergo correction. This remains true even if they belong to a group of macroblocks that was received without any transmission errors.

The foregoing describes a technique for detecting errors in a coded video stream.

The invention claimed is:

1. A method for detecting errors in a coded video stream, comprising:
receiving the coded video stream comprising at least one slice, the at least one slice including at least first and second groups of N macroblocks, wherein a single bit or byte of the coded video stream is associated with both the first and second groups of N macroblocks in the at least one slice, and wherein N is a positive integer;
receiving a first parity code, generated by an encoder, associated with the first group of N macroblocks in the at least one slice;
selecting, at a decoder, bits or bytes from the coded video stream for the first group of N macroblocks, wherein the single bit or byte is selected for the first group of N macroblocks, for calculating, at the decoder, a second parity code over the selected bits or bytes for the first group of N macroblocks;
comparing the first and second parity codes to determine whether the first group of N macroblocks contains an error;
concealing the first group of N macroblocks and subsequent macroblocks in the slice should an error exist;
receiving a third parity code, generated by the encoder, associated with the second group of N macroblocks in the at least one slice;
selecting, at the decoder, bits or bytes from the coded video stream for the second group of N macroblocks, wherein the single bit or byte is also selected for the second group of N macroblocks, for calculating, at the decoder, a fourth parity code over the selected bits or bytes for the second group of N macroblocks; and
comparing the third and fourth parity codes to determine whether the second group of N macroblocks contains an error.

2. The method according to claim 1 wherein the first parity code comprises a Cyclic Redundancy Check code.

3. The method according to claim 2 wherein the calculating a second parity code comprises calculating a second Cyclic Redundancy Check code.

4. A method for detecting errors in a coded video stream, comprising:
receiving the coded video stream comprising at least one slice, the at least one slice including at least first and second groups of N macroblocks, wherein a single bit or byte of the coded video stream is associated with both the first and second groups of N macroblocks in the at least one slice, and wherein N is a positive integer;
selecting bits or bytes for the first group of N macroblocks, wherein the single bit or byte is selected for the first group of N macroblocks, for calculating a first error detection code for the first group of N macroblocks;
selecting bits or bytes for the second group of N macroblocks, wherein the single bit or byte is also selected for the second group of N macroblocks, for calculating a second error detection code for the second group of N macroblocks; and
transmitting the coded video stream along with the first error detection code calculated over the selected bits or bytes for the first group of N macroblocks and the second error detection code calculated over the selected bits or bytes for the second group of N macroblocks
whereby errors in the coded video stream are detectable at a decoder by:
receiving the first error detection code;
selecting bits or bytes from the coded video stream for the first group of N macroblocks, wherein the single bit or byte is selected for the first group of N macroblocks, for calculating a third error detection code over the selected bits or bytes for the first group of N macroblocks;
comparing the first and third error detection codes to determine whether the first group of N macroblocks contains an error;
concealing the first group of N macroblocks and subsequent macroblocks in the slice should an error exist;
receiving the second error detection code;
selecting bits or bytes from the coded video stream for the second group of N macroblocks, wherein the single bit or byte is also selected for the second group of N macroblocks, for calculating a fourth error detection code over the selected bits or bytes for the second group of N macroblocks; and
comparing the second and fourth error detection codes to determine whether the second group of N macroblocks contains an error.

5. The method according to claim 4 wherein the error detection code comprises a Cyclic Redundancy Check code.

6. An apparatus for detecting errors in a coded video stream, comprising:
a receiver configured to:
(a) receive the coded video stream comprising at least one slice, the at least one slice including at least first and second groups of N macroblocks, wherein a single bit or byte of the coded video stream is associated with both the first and second groups of N macroblocks in the at least one slice, and wherein N is a positive integer,
(b) receive a first parity code, generated by an encoder, associated with the first group of N macroblocks in the at least one slice,
(c) select bits or bytes from the coded video stream for the first group of N macroblocks, wherein the single bit or byte is selected for the first group of N macroblocks, for calculating a second parity code for the first group of N macroblocks,
(d) receive a third parity code, generated by the encoder, associated with the second group of N macroblocks in the at least one slice, and
(e) select bits or bytes from the coded video stream for the second group of N macroblocks, wherein the single bit or byte is also selected for the second group of N macroblocks, for calculating, at a decoder, a fourth parity code over the selected bits or bytes for the second group of N macroblocks;
a calculator configured to calculate the second parity code over the selected bits or bytes for the first group of N macroblocks and to calculate the fourth parity code over the selected bits or bytes for the second group of N macroblocks;
a comparator configured to compare the first parity code to the second parity code to determine whether errors exist in the first group of N macroblocks, and to compare the third parity code to the fourth parity code to determine whether errors exist in the second group of N macroblocks; and
a video error concealment arrangement configured to conceal the first group of N macroblocks and subsequent macroblocks in the slice should an error exist in the first group of N macroblocks.

7. The apparatus according to claim 6 wherein the first parity code comprises a Cyclic Redundancy Check code.

8. The apparatus according to claim 7 wherein the second parity code comprises a second Cyclic Redundancy Check code.

9. An apparatus for detecting errors in a coded video stream, comprising:
a selector configured to:
(a) receive a coded video stream comprising at least one slice, the at least one slice including at least first and second groups of N macroblocks, wherein a single bit or byte of the coded video stream is associated with both the first and second groups of N macroblocks in the at least one slice, and wherein N is a positive integer,
(b) select bits or bytes for the first group of N macroblocks from the coded video stream, wherein the single bit or byte is selected for the first group of N macroblocks, for calculating a first error detection code for the first group of N macroblocks, and
(c) select bits or bytes for the second group of N macroblocks, wherein the single bit or byte is also selected for the second group of N macroblocks, for calculating a second error detection code for the second group of N macroblocks; and
a transmitter configured to transmit the coded video stream along with the first error detection code calculated over the selected bits or bytes for the first group of N macroblocks and the second error detection code calculated over the selected bits or bytes for the second group of N macroblocks,
whereby errors in the coded video stream are detectable at a decoder configured to:
receive the first error detection code;
select bits or bytes from the coded video stream for the first group of N macroblocks, wherein the single bit or byte is selected for the first group of N macroblocks, for calculating a third error detection code over the selected bits or bytes for the first group of N macroblocks;
compare the first and third error detection codes to determine whether the first group of N macroblocks contains an error;
conceal the first group of N macroblocks and subsequent macroblocks in the slice should an error exist;
receive the second error detection code;
select bits or bytes from the coded video stream for the second group of N macroblocks, wherein the single bit or byte is also selected for the second group of N macroblocks, for calculating a fourth error detection code over the selected bits or bytes for the second group of N macroblocks; and
compare the second and fourth error detection codes to determine whether the second group of N macroblocks contains an error.

10. The apparatus according to claim 9, wherein the first error detection code comprise a Cyclic Redundancy Check code.

* * * * *